United States Patent [19]

Saluke

[11] 3,975,574

[45] Aug. 17, 1976

[54] MAGNETIC COATINGS FOR CREDIT CARDS

[75] Inventor: William M. Saluke, Dayton, Ohio

[73] Assignee: NCR Corporation, Dayton, Ohio

[22] Filed: Oct. 13, 1972

[21] Appl. No.: 298,719

Related U.S. Application Data

[63] Continuation-in-part of Ser. No. 176,738, Aug. 31, 1971, abandoned.

[52] U.S. Cl. ............................. 428/483; 156/230; 156/309; 428/500; 428/900
[51] Int. Cl.² ............................................ G11B 5/70
[58] Field of Search .................. 117/235, 237, 239; 161/158, 162; 427/128; 428/483, 520, 900; 156/230; 40/2.2

[56] References Cited
UNITED STATES PATENTS

| | | | |
|---|---|---|---|
| 2,819,186 | 1/1958 | Franck | 117/239 |
| 3,149,995 | 9/1964 | Bauer | 117/235 |
| 3,149,996 | 9/1964 | Wagner et al. | 117/239 |
| 3,497,411 | 2/1970 | Chebiniak | 156/289 |
| 3,725,184 | 4/1973 | Scopp | 156/313 |
| 3,754,959 | 8/1973 | Peters et al. | 117/235 |
| 3,821,060 | 6/1974 | Braca et al. | 161/145 |

*Primary Examiner*—James J. Bell
*Attorney, Agent, or Firm*—E. Frank McKinney; Robert J. Shafer

[57] ABSTRACT

Magnetic coatings comprised of magnetic pigments in a polyvinyl chloride-polyvinyl acetate or polyester binder are disclosed. The coatings can be placed on a transfer base such as polyethylene terephthalate and transferred to polyvinyl chloride or polyvinyl chloride-polyvinyl acetate copolymer credit card bases. The magnetic coating on the credit card base can be overcoated with a thin film of material such as polyvinyl chloride-polyvinyl acetate copolymer when the polyvinyl chloride-polyvinyl acetate binder is employed. If a polyester binder is employed in place of the polyvinyl chloride-polyvinyl acetate binder, the transfer base, e.g., polyethylene terephthalate, will adhere to the credit card base as an overcoat. The resulting credit cards are resistant to scratching and other surface damage. Excellent bonding between the magnetic coating and the credit card base is provided while maintaining a desirable degree of flexibility and a minimum degree of card distortion.

3 Claims, No Drawings

MAGNETIC COATINGS FOR CREDIT CARDS

This is a continuation-in-part patent application of U.S. Pat. application Ser. No. 176,738, filed Aug. 31, 1971, now abandoned.

This invention relates to magnetic coatings, transfer media, credit cards and processes for transferring the magnetic coatings to the credit cards.

Magnetic transfer media are well known to the prior art. A representative example is U.S. Pat. No. 3,284,360. This patent discloses a transfer sheet comprising a base sheet such as polyethylene terephthalate and a transfer coating on the sheet such as iron oxide in a binder of stearamide.

A transfer coating of magnetic pigment in a binder of polyvinyl chloride-polyvinyl acetate copolymer (hereinafter referred to as PVC-PVAc) now has been found. A polyester binder is employed when it is desired to bind the transfer base to the credit card base as an overcoat. Magnetic transfer media is formed by coating a solution of magnetic pigment and binder onto a transfer sheet such as polyethylene terephthalate and allowing the solvent to evaporate. The transfer coating then can be transferred by heat and pressure to sheets of polyvinyl chloride or polyvinyl chloride-polyvinyl acetate copolymer to produce the credit cards of this invention. The magnetic coating on the credit card base can be overcoated with a thin film of material. These coatings are tack-free at room temperature, and transfer at relatively low temperatures, e.g., approximately 250° F. The resulting credit card possesses a minimum of distortion and provides a smooth coating. The credit card of this invention is flexible, yet retains a high degree of bonding between the magnetic coating and the credit card base.

Accordingly, an object of this invention is to provide magnetic transfer coatings.

Another object of this invention is to provide magnetic transfer media.

Still another object of this invention is to provide credit cards with magnetic coatings thereon.

An additional object of this invention is to provide a process for transferring the magnetic coatings to the credit cards.

Other objects, aspects and advantages of this invention will be apparent to one skilled in the art from the following specification and appended claims.

The magnetic coatings of this invention comprise, on a wet basis, binder, magnetic pigment and solvent. On a dry basis, the magnetic coatings comprise binder and magnetic pigment. The ratio by weight of magnetic pigment to binder ranges from 3:1 to 1:3, preferably 2:1. The wet solution generally contains 40 to 60 weight percent solvent, preferably 50 to 60 weight percent.

The term polyester as used herein includes those polyester resins containing condensates of a polyhydric alcohol, e.g., a $C_2$ to $C_{10}$ acid having from 2 to 16 carbon atoms. Examples of these polyester condensates are: poly(ethylene succinate); poly(ethylene sebacate); poly(propylene fumarate); poly(ethylene terephthalate); and the like.

The magnetic coating can be prepared by any means known to the art which assures a uniform mixture of binder, pigment and solvent. The wet magnetic coating can be applied to the transfer base by roll coating, knife coating or any other means known to the art. The solvent can be evaporated at ambient temperature or can be evaporated by the application of gentle heat.

The magnetic pigment employed in this invention varies widely, iron pigments such as $Fe_3O_4$, $Fe_2O_3$ and the like and mixtures thereof being preferred. Other metals or their oxides can be employed as well as alloys of iron or copper with aluminum, nickel, cobalt or carbon. Metal carbonyls and iron alloy with chromium, tungsten or molybdenum are still further examples of the magnetic pigments that can be employed in this invention.

These magnetic pigments generally are prepared as finely divided particles by various methods known in the art. The particle size distribution can range from 0.1 to 10 microns, though a larger size can be employed. A preferred particle size distribution ranges from 0.5 to 5 microns.

The solvent employed in this invention generally is an aliphatic or aromatic hydrocarbon solvent such as mineral spirits, naphtha, xylene, toluene, methyl ethyl ketone or mixtures thereof. Other solvents that can be employed in this invention are isopropyl alcohol, isobutyl alcohol, 3-heptanol, 1,4-dioxane, isoamyl acetate, ethyl amyl ketone, diisobutyl ketone, carbon tetrachloride, carbon disulfide or mixtures thereof. A preferred solvent is 1 to 1 mixture of weight of toluene and methyl ethyl ketone.

The transfer base to which the coating is applied is a thin flexible carrier substrate such as a film, web, sheet, ribbon, fabric or the like. The preferred base is a film of polyethylene terephthalate. Other transfer bases are cellulosic materials, cellophane, nylon, rubber hydrochloride, polyethylene, polypropylene or the like. The transfer base generally has a thickness of 0.2 to 2 mils, preferably 0.3 to 1 mil.

The credit card base is a sheet of polyvinyl chloride or polyvinyl chloride-polyvinyl acetate copolymer. Generally, the sheet will have the dimensions of a typical credit card, i.e., 3½ × 1/32 inch.

After the wet coating has been applied to the transfer base and the solvent has evaporated, the resulting transfer media then is placed over the credit card sheet with the magnetic coating in contact with the credit card. The transfer media is subjected to a pressure ranging from 20 to 100 psi and a temperature ranging from 225° to 300° F. for a time ranging from 0.1 to 1 second. Preferably, the pressure ranges from 40 to 60 psi, the temperature ranges from 250° to 275° F. and the time is 0.5 seconds. When the PVC-PVAc binder is employed, the transfer base, after cooling, is picked or peeled off of the credit card leaving the credit card with the magnetic coating adhered thereto. Generally, the magnetic coating is in the form of a ¼ inch stripe across the card in a horizontal or vertical direction. The combination of a polyvinyl chloride or PVC-PVAc credit card base and a PVC-PVAc binder for the magnetic pigment produces excellent bonding between the transfer coating and credit card base. The resulting credit card possesses a minimum of distortion, provides a smooth coating and is tack free at room temperature. These results are achieved by employing relatively mild conditions of time, temperature and pressure.

In another embodiment of this invention, the transfer base can be bonded to the credit card over the magnetic coating by employing a polyester binder instead of a PVC-PVAc binder. The magnetic coating thus is sandwiched between the credit card base and the thin-protective transfer base. Again, a preferred transfer base is abrasion-resistant polyethylene terephthalate film.

A third embodiment of this invention is to coat a transfer base such as those previously described with a solution of PVC-PVAc resin in a solvent such as those previously described. The solution generally comprises from 5 to 25 weight percent PVC-PVAc resin and from 75–95 weight percent solvent, preferably 10 weight percent resin and 90 weight percent solvent. After the wet coating has been applied to the transfer base and the solvent has evaporated, the resulting transfer media is placed over the magnetic coated surface of the credit card. The transfer media is subjected to a pressure ranging from 20 to 100 psi and a temperature ranging from 225° to 300° F. for a time ranging from 0.1 to 1.0 seconds. Preferably, the pressure ranges from 20 to 60 psi, the temperature ranges from 250° to 275° F. and the time is 0.5 seconds. After cooling, the transfer base is picked or peeled off the credit card. The magnetic coating thus is sandwiched between a polyvinyl chloride or PVC-PVAc credit card base and a thin-protective PVC-PVAc overcoat. In addition, the magnetic pigment is in a binder of PVC-PVAc resin. Such a coating is employed where scratching or other surface damage would be highly harmful to the quality of the magnetic record.

In all three of the above-described embodiments, after the application of temperature and pressure, the binder, credit card base and thin over layer, if present, interbond one to another by interfusion between the surfaces thereof.

All of the pressures of this invention are described by guage reading, i.e., total jaw pressure, for a 1 inch × 12 inch platen area.

The advantages of this invention are further illustrated by the following examples. The materials, proportions and other specific conditions are presented as being typical and should not be construed to limit the invention unduly.

EXAMPLE I

A uniform mixture was prepared to the following specifications:

|  | Weight Percent Wet Solution |
|---|---|
| Polyvinyl chloride-polyvinyl acetate resin | 14 |
| Modified iron oxide pigment (MO-9853 from C. K. Pfizer Co.) | 30 |
| 1 to 1 mixture by weight of toluene and methyl ethyl ketone | 56 |

The solution was coated onto a film of polyethylene terephthalate by conventional means. After drying, the magnetic coating contains 32 weight percent resin and 68 weight percent iron oxide. The resulting transfer media was placed over a PVC-PVAc credit card base with the magnetic coating in contact with the credit card. The transfer media was subjected to a pressure of 40 psi and a temperature of 250° F. for a time of 0.5 seconds. After cooling, the polyethylene terephthalate transfer base was peeled away from the credit card. The PVC-PVAc credit card and PVC-PVAc binder for the iron oxide provides excellent bonding between the transfer coating and credit card base. The product is scratch resistant and tack free at room temperature. The product is flexible and possesses a minimum of distortion.

EXAMPLE II

A uniform mixture was prepared to the following specifications:

|  | Weight Percent Wet Solution |
|---|---|
| Polyester Resin (duPont 46850) | 12.5 |
| Magnetic pigment (MO-9853 from C. K. Pfizer Co.) | 27.5 |
| 1–4 Dioxane | 60.0 |
|  | 100.0 |

The solution was coated onto a film of polyethylene terephthalate by conventional means. After drying, the magnetic coating contains 31 weight percent resin and 69 weight percent iron oxide. The resulting transfer media was placed over a PVC-PVAc credit card base with the magnetic coating in contact with the credit card. The transfer media was subjected to a pressure of 40 psi and a temperature of 250° F. for a time of 0.5 seconds. After cooling, the polyethylene terephthalate film could not be peeled away, but remained firmly affixed over the magnetic stripe. In this case, the polyester resin which serves as the pigment binder also serves as a laminating media due to its excellent adhesion to both the PVC-PVAc credit card base and the polyethylene terephthalate substrate. The product is scratch resistant and tack free to room temperature. The product is flexible and possesses a minimum of distortion.

EXAMPLE III

A solution of 10 weight percent PVC-PVAc resin, 90 weight percent 1 to 1 mixture of toluene and methyl ethyl ketone was prepared and coated onto a polyethylene terephthalate film. After evaporation of the solvent, the resulting transfer media was placed in contact with the magnetic coated credit card of Example I, i.e., the PVC-PVAc coating of the transfer media was placed in contact with the magnetic coating of the credit card. A pressure of 40 psi at a temperature of 250° F. for a time of 0.5 seconds was applied to the transfer media. After cooling, the polyethylene terephthalate film peels away. The resulting product consists of a PVC-PVAc credit card base and a PVC-PVAc overcoat with a coating of iron oxide in a PVC-PVAc binder sandwiched between the base and overcoat. This product is highly resistant to scratching.

Although this invention has been described in considerable detail, it must be understood that such detail is for the purpose of illustration only and that many variations and modifications can be made by one skilled in the art without departing from the scope and spirit thereof.

What is claimed is:

1. A credit card comprising a polyvinyl chloride or polyvinyl chloride-polyvinyl acetate copolymer credit card base with a magnetic coating thereon wherein the magnetic coating is a dry mixture of magnetic pigment in a polyvinyl chloride-polyvinyl acetate copolymer binder, wherein the ratio by weight of the pigment to the binder ranges from 3:1 to 1:3, and wherein the binder and the credit card base are interbonded one to another by interfusion of the surfaces of the binder and the credit card base.

2. A credit card comprising a polyvinyl chloride or polyvinyl chloride-polyvinyl acetate copolymer credit card base with a magnetic coating thereon wherein the magnetic coating is a dry mixture of magnetic pigment in a polyester binder, wherein the ratio by weight of the pigment to the binder ranges from 3:1 to 1:3, wherein a thin layer of polyethylene terephthalate is adhered to the credit card base over the magnetic coating, and wherein the binder, the credit card base and the thin layer are interbonded one to another by interfusion of the surfaces of the binder, the credit card base and the thin layer.

3. A credit card according to claim 1 wherein a thin layer of polyvinyl chloride-polyvinyl acetate copolymer is adhered to the credit card base over the magnetic coating, and wherein the binder, the credit card base and the thin layer are interbonded one to another by interfusion of the surfaces of the binder, the credit card base and the thin layer.

* * * * *